Patented Oct. 9, 1934

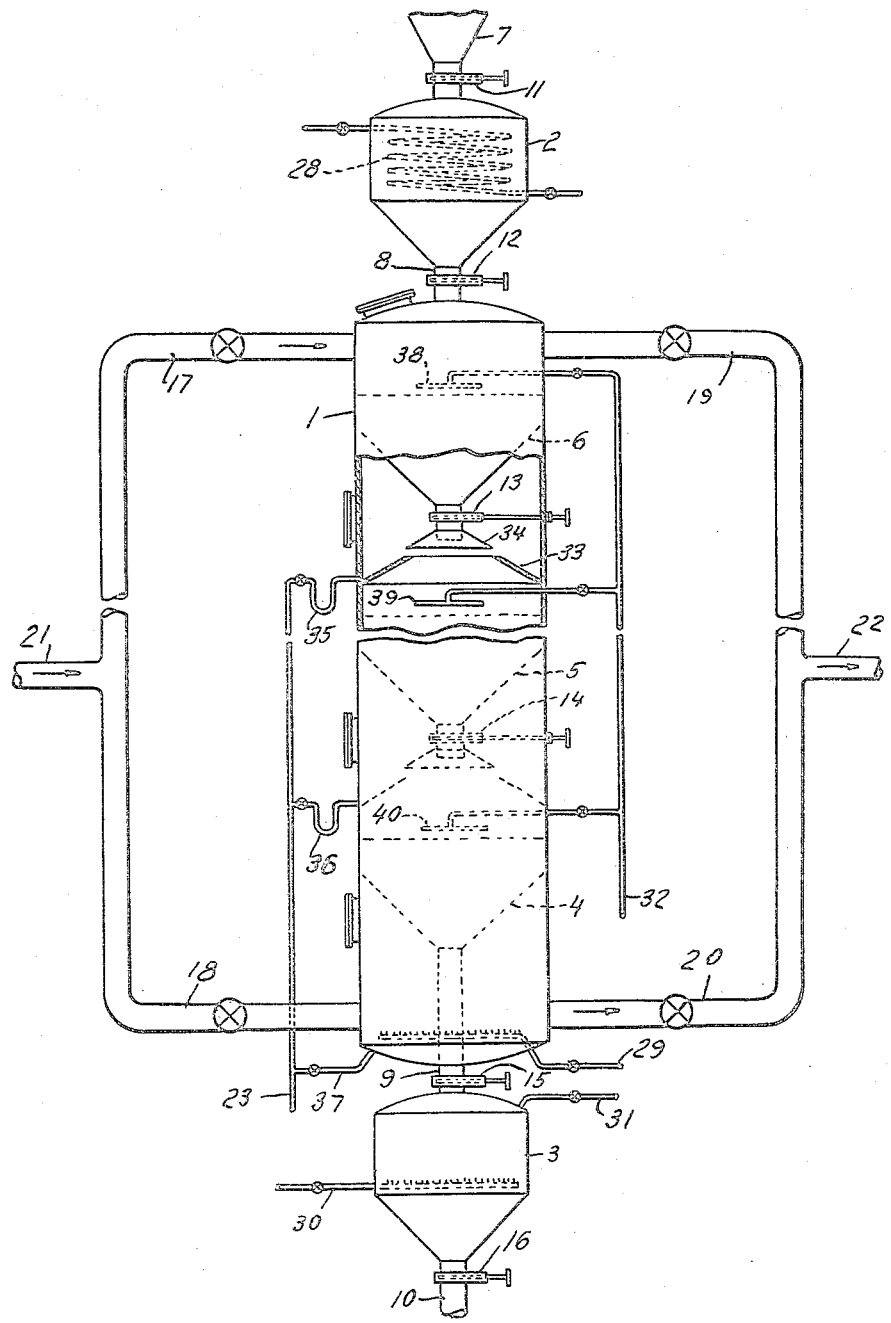

1,976,000

UNITED STATES PATENT OFFICE 1,976,000

APPARATUS FOR REFINING HYDROCARBONS

Frank A. Apgar, Hammond, Ind., and Kenneth A. Beach, Chester, Pa., assignors to Sinclair Refining Company, New York, N. Y., a corporation of Maine Original application February 25, 1928, Serial No. 256,978. Divided and this application October 19, 1931, Serial No. 569,714

15 Claims. (Cl. 196—96)

This invention relates to an improved apparatus for the refining of hydrocarbons and hydrocarbon mixtures in the vapor phase. The apparatus of the present invention is useful, for example, in the vapor phase refining of gasoline and kerosene and other hydrocarbon oils. This application is a division of our application filed February 25, 1928, Serial Number 256,978.

The apparatus of the present invention is particularly adapted for use in vapor phase refining operations in which the hydrocarbon vapors are passed in contact with an adsorptive catalyst such as fuller's earth, to separate, by adsorption or polymerization or otherwise, components of the hydrocarbon vapors not suitable as constituents of the desired product. As this type of operation is commonly carried out, the hydrocarbon vapors are passed in contact with a batch of the adsorptive catalyst which is initially fresh and highly active and which is replaced by a fresh batch by the time it is substantially spent and almost inactive. The progressive loss in activity of the adsorptive catalyst is due, at least in part, to retention therein of products of the reactions involved in the refining operation, such as high boiling polymers. This progressive loss in activity of the adsorptive catalyst is accelerated in cases where such polymers, for example, are produced in large amounts. For practical purposes, the expense of replacing or renewing the adsorptive catalyst cannot be disregarded and it is, therefore, important to make full use of the adsorptive catalyst. The expense of apparatus and operation must also be kept within reasonable limits with respect to capacity. This invention provides an improved apparatus which makes possible an important improvement in prolonging the period of useful activity of the adsorptive catalyst used in the refining operation without involving expensive apparatus or operation. The improved apparatus of the invention has several further important advantages.

In the operation of the apparatus of the present invention, the hydrocarbon vapors to be subjected to the refining treatment are passed successively through a series of bodies of the adsorptive catalyst and alternate free vapor spaces. The polymers produced by the vapor-catalyst contact in the successive bodies of the series are separated from the vapor stream in the intermediate free vapor spaces and these separated polymers are then discharged from the operation without being permitted again to come in contact with the several bodies of the adsorptive catalyst. The hydrocarbon vapors are passed through the free vapor spaces between the successive catalyst bodies at a velocity relatively low with respect to the velocity of passage through the catalyst bodies, promoting separation of liquefied material from the vapor stream passing between successive bodies of the adsorptive catalyst. This progressive separation and discharge from the operation of polymers as formed is particularly advantageous in improving the useful life of the adsorptive catalyst, particularly where high boiling polymers are produced in large amounts.

The invention will be further described in connection with the accompanying drawing which illustrates, diagrammatically and conventionally, in elevation and partly in section and with parts broken away, apparatus embodying the invention, but it is intended and will be understood that this more detailed description and illustration of the invention are by way of exemplification.

The apparatus illustrated comprises a tower 1, in which the vapor phase refining operation proper is carried out, a chamber 2 for preheating the adsorptive catalyst supplied to the operation, and a chamber 3 for stripping the adsorptive catalyst discharged from the operation of vaporizable hydrocarbons. The tower 1 is divided into a series of compartments separated by foraminous partitions 4, 5 and 6 adapted to retain charges of the adsorptive catalyst but to permit free passage of hydrocarbon vapors. A hopper 7 is provided for charging chamber 2 and a connection 8 is provided for supplying the preheated adsorptive catalyst from chamber 2 to the uppermost compartment in tower 1. A connection 9 is provided for discharging spent material from the lowermost compartment in tower 1 into chamber 3 and a connection 10 is provided for discharging stripped spent material from chamber 3. The bottoms of the chambers 2 and 3 and the partitions separating the compartments in the tower 1 are sloped toward the discharge point to facilitate progress of the adsorptive catalyst through the apparatus. Valves 11, 12, 13, 14, 15 and 16 are provided for controlling the supply of the adsorptive catalyst to the apparatus, the passage of the adsorptive catalyst through the apparatus and the discharge of the adsorptive catalyst from the apparatus. The hydrocarbon vapors to be refined may be passed upwardly or downwardly through the tower 1, the apparatus illustrated including branch connections 17, 18, 19 and 20, between connection 21 through which the hydrocarbon vapors are supplied to the apparatus and connection 22 through which the hydrocarbon vapors are discharged from the apparatus, to permit operation in either manner. Connection 23 is provided for discharging from the apparatus liquefied hydrocarbons including polymers produced in the refining operation. Connection 32 is provided for supplying temperature controlling or washing media to the apparatus. The supply chamber 2 is provided with suitable heating means, such as the steam coil 28 illustrated. Connection 29 communicating with a perforated discharge pipe in the interior of the tower 1 is provided for the introduction of steam or other suitable heating medium into the lower end of the tower. Connection 30 communicating with a perforated discharge pipe in the interior of the discharge chamber 3 is similarly provided for the introduction of steam or other suitable stripping medium into this chamber. Connection 31 communicates with a condenser and receiver for the recovery of condensable hydrocarbons vaporized from discharged adsorptive catalyst. The several connections illustrated are provided with valves, as shown, to afford appropriate control. It will be understood that the number of compartments in the tower 1 may be varied to suit the requirements of a particular case.

Below each of the foraminous partitions dividing tower 1 into compartments, except the lowermost, and above the level of the normal charge of adsorptive catalyst in the next lower compartment, a pair of frustro-conical baffles 33 and 34 are arranged to form a trap from which the liquefied material separated from the vapor stream in the free vapor space immediately beneath the next above foraminous partition may be discharged through connections 35 and 36. Liquefied material may be discharged from the lower end of the tower through connection 37. Spray heads 38, 39 and 40 are provided in each of the compartments in the tower 1, for the introduction of temperature controlling or washing media supplied through connection 32.

In the operation of the apparatus illustrated, the hydrocarbon vapors to be refined are supplied through connection 21 and passed through the tower 1 and the charges of the adsorptive catalyst therein, and the refined vapors are discharged through connection 22. The operation is advantageously carried out with downflow of the hydrocarbon vapors through the tower and the catalyst charges therein. As the hydrocarbon vapors contact with the adsorptive catalyst, for example, fuller's earth of 40–60 or 60–80 mesh, certain types of unsaturated constituents, such as diolefines, to the extent that they are present are polymerized, forming polymers of boiling point higher than that of these constituents as originally present. This reaction, under appropriately regulated conditions, makes possible the separation of such constituents as a condensate liquefied from the vapors. In refining gasoline, for example, this operation makes possible the removal of such constituents which are objectionable as components of gasoline intended for use as motor fuel without the removal of other unsaturated constituents which are desirable components of motor fuel products. In addition to constituents polymerized by the action of the adsorptive catalyst other undesirable constituents may be removed from hydrocarbon vapors at the same time by the action of the adsorptive catalyst.

In the apparatus of the invention, the temperature of the hydrocarbon vapors, as they pass through the several bodies of the adsorptive catalyst and as they escape from the refining operation, is controlled to condense such polymers or other high boiling products of the reactions involved in the refining operation. This liquefied material seeps downwardly through the charge of the adsorptive catalyst in which it is formed but before it can pass on down through the next lower charge of the adsorptive catalyst it is caught in the trap formed by the next lower pair of baffles 33 and 34. With downflow of vapors, the movement of the vapors assists in carrying such liquefied material through the charges of the adsorptive catalyst. Similarly, any entrained liquefied material is separated from the vapor stream as the velocity of the vapors is reduced in passing through the free vapor space immediately beneath each of the foraminous partitions supporting catalyst charges, and such separated material is also caught in the traps provided. The liquefied material caught in the several traps, or part of it, is discharged through connections 35 and 36.

The apparatus of the invention provides means for independently controlling the temperature of the several bodies of the adsorptive catalyst in the compartments in the tower by independently regulated introduction of a suitable temperature controlling medium through the spray heads 38, 39 and 40, or, if desired, the apparatus may be operated with the introduction of a temperature controlling medium into only that compartment in the tower through which the vapors last pass. Suitable temperature controlling media include gasoline and gasoline-containing fractions, for example, gasoline fractions to be blended with gasoline subjected to the refining operation.

The washing action of a suitable liquid medium may also serve to assist in carrying liquefied material through and out of the several bodies of the adsorptive catalyst and such washing media are with advantage independently supplied to each of the several bodies of the adsorptive catalyst, through the spray heads 38, 39 and 40. Suitable washing media include gasoline, kerosene, and fractions of solvent naphtha character. The material liquefied in the tower itself may exert within limits a washing action, and to secure the benefit of such action, a part of the condensate separated in the several traps may be allowed to overflow into the next lower compartment. A part of such liquefied material may be so caused to flow on downwardly through the tower, for example, if in any particular case the several charges of the adsorptive catalyst tend in operation to become too dry, although usually it is more advantageous to supply an external washing medium and to discharge the liquefied material caught in the several traps without permitting any of it to flow on downwardly through the lower bodies of the catalyst.

It will be apparent that the same agent may operate as a temperature controlling medium and a washing medium. The supply of any temperature controlling medium used, however, is regulated to maintain the desired temperature conditions, whereas a washing medium may be supplied continuously or intermittently during the operation. If the introduction of washing media tends to interfere with the uniformity of the operation, particularly where such media are supplied intermittently to flush out the catalyst charges, the washing media may be preheated before introduction.

In bringing the apparatus illustrated into operation, in order to allow for initial high activity of the adsorptive catalyst, only the uppermost compartment is initially charged, the adsorptive catalyst from this compartment is discharged into the next lower compartment and additional fresh material is supplied to the uppermost compartment before the activity of the first charge has decreased too far to secure the desired refining action, and so on, until there is a normal operating charge of the adsorptive catalyst in each of the compartments of the tower. Prior to the first introduction of hydrocarbon vapors, the tower and the initial charge of the adsorptive catalyst may be brought approximately to the operating temperature by passage therethrough of hot dry steam or other suitable heating medium. When the normal operating balance is reached, each of the compartments in the tower contains a charge of the adsorptive catalyst, and as the operation proceeds the several charges of the adsorptive catalyst are at regular intervals progressively advanced through the tower, fresh charges of the adsorptive catalyst are supplied to the uppermost compartment and spent charges of the adsorptive catalyst are discharged from the lowermost compartment. It will be understood that the progressive advance of the several charges of the adsorptive catalyst through tower 1 is effected by successively opening valve 15 to discharge the material in the lowermost compartment into the discharge chamber 3 and then closing this valve, opening valve 14 to discharge material in the next compartment above into the lowermost compartment and then closing this valve, and so on until a fresh charge is introduced into the uppermost compartment after valve 13 is closed by opening valve 12 to discharge the contents of the supply chamber 2 into the uppermost compartment and then closing this valve.

By use of the apparatus illustrated, an improved uniformity of refining is secured with respect both to the operation and to the product. The apparatus of the present invention is of special value and application in connection with the refining of gasoline products produced by vapor phase cracking or other cracking operations in which the stock supplied to the operation is subjected to relatively severe cracking conditions resulting in the formation of a composite product containing a large proportion of constituents which are polymerized when contacted in the vapor phase with an adsorptive catalyst.

The apparatus of the invention makes it possible to employ this type of refining operation with advantage in cases where it might otherwise be economically useless because of the short life of the adsorptive catalyst.

The apparatus of the invention is particularly useful in connection with refining operations involving the use of fuller's earth, an adsorptive catalyst which has been mentioned particularly. The apparatus is also useful in connection with refining operations carried out with other adsorptive catalysts such as activated carbon, silica gel, metallic gels and similar agents.

We claim:

1. Apparatus for refining hydrocarbons in the vapor phase, comprising a tower divided into a series of superimposed compartments separated by foraminous partitions having bodies of solid adsorptive catalytic material extending entirely across said compartments supported thereon, said foraminous partitions being adapted to retain the adsorptive catalyst but to permit free passage of vapors, a vapor inlet at the upper end of the tower and a vapor outlet at the lower end of the tower and means for directing a free flow of vapor downwardly through the beds of adsorptive catalytic material, and trap means for discharging liquid from the tower from beneath said several foraminous partitions, except the lowermost, without contacting the liquid with the adsorptive catalytic material in the next lower compartments.

2. In an apparatus of the character described, a treating tower, a partition dividing said tower into superposed chambers, beds of solid adsorptive material supported for free drainage within said chambers, said beds being of different degrees of activity, means for withdrawing from each chamber liquid draining from the adsorptive material contained in such chamber, means for directing vapor downwardly through the beds of adsorptive material in the order of successively decreasing activity, and means for discharging spent adsorptive material and introducing fresh catalytic material.

3. An apparatus of the character described comprising a tower, partitions dividing said tower into superposed chambers, a bed of catalytic material supported for free drainage in each chamber, means for withdrawing from each chamber liquid draining from the catalytic material contained therein, means for passing vapor downwardly successively through the beds of catalytic material, means for removing a spent bed of catalytic material from the cycle of flow and substituting a partially spent bed therefor, and means for introducing a fresh bed of catalytic material into said cycle.

4. An apparatus of the character described comprising a tower, a partition dividing said tower into superposed chambers, a bed of catalytic material supported for free drainage in each chamber, means for removing from each chamber liquid drained from the catalytic material therein, means for passing a vapor stream downwardly successively through said beds of catalytic material, means for removing a bed of spent catalytic material from the cycle of flow, means for introducing a fresh bed of catalytic material into said cycle, and means for directing vapors through the beds of catalytic material in the inverse order of their activity.

5. In an apparatus of the character described, a tower, a partition dividing said tower into superposed chambers, fluid permeable shelves within each chamber, a bed of catalytic material supported by each shelf, means for passing vapor downwardly successively through said chambers and the treating material contained therein, means for withdrawing from each chamber liquid drained from the catalytic material therein, means for removing a spent bed of catalytic material from the cycle of flow, means for introducing a fresh bed of catalytic material into said cycle, and means for directing vapors through the beds in the inverse order of their activity.

6. In an apparatus of the character described, a treating tower, a partition dividing said tower into superposed chambers, means for draining liquid from each of said chambers, a fluid permeable shelf in each chamber, a bed of catalytic material supported by each shelf, means for passing vapor downwardly successively through said chambers and the treating material contained therein, means for removing a bed of spent catalytic material from the cycle flow, means for introducing a bed of fresh catalytic material into said cycle, and means for directing the vapors through said beds in the inverse order of their activity.

7. In an apparatus of the character described, a treating tower, an impermeable partition therein forming superposed treating chambers, a fluid permeable shelf in each of said treating chambers, a bed of solid adsorptive catalytic material supported by each shelf, means for draining liquid accumulated in each of said chambers, means for passing vapor successively downwardly through said chambers and the treating material contained therein, means for removing a bed of spent catalytic material from the cycle of flow, means for introducing a bed of fresh catalytic material into said cycle, and means for directing the vapor through said beds in the inverse order of their activity.

8. An apparatus of the character described comprising a tower, a partition dividing said tower into chambers, beds of treating material supported in said chambers for free drainage, means for passing vapor successively downwardly through said chambers and the treating material contained therein, means intermediate said chambers for separating entrained liquids from the vapor, and means for withdrawing from each chamber liquid drained from the treating material therein.

9. In an apparatus of the character described, a treating tower divided into communicating superposed chambers, beds of solid adsorptive material supported for free drainage within said chambers, said beds being of different degrees of activity, means for withdrawing from each chamber liquid draining from the adsorptive material contained in such chamber, means for directing vapor downwardly through the beds of adsorptive material in the order of successively decreasing activity, and means for discharging spent adsorptive material and introducing fresh catalytic material.

10. In an apparatus of the character described, a treating tower divided into communicating superposed chambers, a bed of catalytic material supported for free drainage in each chamber, means for withdrawing from each chamber liquid draining from the catalytic material contained therein, means for passing vapor downwardly successively through the beds of catalytic material, means for removing a spent bed of catalytic material from the cycle of flow and substituting a partially spent bed therefor, and means for introducing a fresh bed of catalytic material into said cycle.

11. In an apparatus of the character described, a treating tower divided into communicating superposed chambers, a bed of catalytic material supported for free drainage in each chamber, means for removing from each chamber liquid drained from the catalytic material therein, means for passing a vapor stream downwardly successively through said beds of catalytic material, means for removing a bed of spent catalytic material from the cycle of flow, means for introducing a fresh bed of catalytic material into said cycle, and means for directing vapors through the beds of catalytic material in the inverse order of their activity.

12. In an apparatus of the character described, a treating tower divided into communicating superposed chambers, fluid permeable shelves within each chamber, a bed of catalytic material supported by each shelf, means for passing vapor downwardly successively through said chambers and the treating material contained therein, means for withdrawing from each chamber liquid drained from the catalytic material therein, means for removing a spent bed of catalytic material from the cycle of flow, means for introducing a fresh bed of catalytic material into said cycle, and means for directing vapors through the beds in the inverse order of their activity.

13. In an apparatus of the character described, a treating tower divided into communicating superposed chambers, means for draining liquid from each of said chambers, a fluid permeable shelf in each chamber, a bed of catalytic material supported by each shelf, means for passing vapor downwardly successively through said chambers and the treating material contained therein, means for removing a bed of spent catalytic material from the cycle flow, means for introducing a bed of fresh catalytic material into said cycle, and means for directing the vapors through said beds in the inverse order of their activity.

14. In an apparatus of the character described, a treating tower divided into communicating superposed chambers, a fluid permeable shelf in each of said treating chambers, a bed of solid adsorptive catalytic material supported by each shelf, means for draining liquid accumulated in each of said chambers, means for passing vapor successively downwardly through said chambers and the treating material contained therein, means for removing a bed of spent catalytic material from the cycle of flow, means for introducing a bed of fresh catalytic material into said cycle, and means for directing the vapor through said beds in the inverse order of their activity.

15. In an apparatus of the character described, a treating tower divided into communicating superposed chambers, beds of treating material supported in said chambers for free drainage, means for passing vapor successively downwardly through said chambers and the treating material contained therein, means intermediate said chambers for separating entrained liquids from the vapor, and means for withdrawing from each chamber liquid drained from the treating material therein.

FRANK A. APGAR.
KENNETH A. BEACH.